United States Patent [19]

Yajima

[11] 4,291,341
[45] Sep. 22, 1981

[54] COMPOSITE RECORDING APPARATUS FOR RECORDING INFORMATION FROM DIFFERENT INFORMATION SOURCES

[75] Inventor: Tatsuo Yajima, Hino, Japan

[73] Assignee: Konishiroku Photo Industry Co., Ltd., Tokyo, Japan

[21] Appl. No.: 66,424

[22] Filed: Aug. 14, 1979

[30] Foreign Application Priority Data

Aug. 18, 1978 [JP] Japan ................................ 53-100012

[51] Int. Cl.³ ........................ G03G 15/00; H04N 1/22
[52] U.S. Cl. .................................. 358/300; 355/14 C; 346/153.1
[58] Field of Search .................... 355/14 C, 14 SH; 346/153; 358/296, 300; 271/279, 280

[56] References Cited

U.S. PATENT DOCUMENTS 4,099,860 7/1978 Connin .............................. 355/14 C
4,162,848 7/1979 Platt ................................. 355/14 C
4,213,694 7/1980 Kuseski .......................... 355/14 C Primary Examiner—John H. Wolff
Assistant Examiner—Donald McElheny, Jr.
Attorney, Agent, or Firm—Bierman & Bierman

[57] ABSTRACT

In a recording apparatus for recording information on copy sheets from multiple sources including an optical system for projecting an image of an original in accordance with an optical copying operation, a reproducing device for operation in accordance with an electric signal based reproduction operation, and a receiving tray for receiving copy sheets discharged from the recording apparatus, a sorting tray for receiving discharged copy sheets bearing information resulting from a reproduction operation and disposed for relative movement with respect to the receiving tray so that discharged copy sheets of optical copying operations are directed to the receiving tray and discharged sheets of reproduction operations are directed to the sorting tray.

4 Claims, 4 Drawing Figures

COMPOSITE RECORDING APPARATUS FOR RECORDING INFORMATION FROM DIFFERENT INFORMATION SOURCES

BACKGROUND OF THE INVENTION

1. Field of the Invention

The present invention relates to a composite-recording apparatus for recording information from different information sources, and includes an optical system for projecting an image of an original supported on a copy board onto a photosensitive medium thereby to form an electrostatic latent image thereon, reproducing means for reproducing electric information on the photosensitive medium as an electrostatic latent image through scanning operation, and developing means for visualizing the electrostatic latent image on the photosensitive medium to be recorded.

In this specification, definition will be made of the meaning of the phrase "reproducing means" or "reproducing apparatus" or a like expression. With this term, it is intended to express an electric quantity-to-light converter such as an optical fiber tube (OFT), a thin window tube (TWT), a laser beam scanner, or like apparatus which serves to convert external or internal input information supplied as an off-line signal or on-line into a corresponding electrostatic image to be reproduced on a photosensitive medium through a scanning operation.

2. Description of the Prior Art

In general, in the field of image information processing techniques, a variety of copying apparatus for obtaining a record of the contents of an original to be copied are employed, while various facsimile printers are used for recording information transmitted from remote facsimile equipment. However, installations of separate, plural equipment for different functions involves a disadvantage from the economic viewpoint in respect of the expenditures involved as well as the available space to be occupied by the equipment. For these reasons, a multipurpose information recording apparatus is being developed by making use of a series of common processes carried out in succession to the formation of the latent image involved in both the copying apparatus and the facsimile printer. For example, a typical multi-recording or composite recording apparatus in disclosed in Japanese Laid-Open Patent Application No. 63340/1977 filed under the title "Composite Apparatus For Image Reproduction and Image Formation". The disclosed composite apparatus includes an optical system for projecting an image of an original resting on a copy board onto a photosensitive medium, and an optical fiber for reproducing the viedo signal supplied from an external information source on the photosensitive medium. The composite apparatus is capable of operating as a copying apparatus as well as an optical printer and is thus advantageous over the mere aggregation of a copying machine and an optical printer from the economic standpoint. However, the composite apparatus disclosed in the above patent application suffers from difficulties in that the optical system and the optical fiber tube have to be selectively positioned at the image projecting position in dependence on the copying and reproducing operations. For example, the composite apparatus can not accommodate any emergent or urgent recording request issued from the external information source, when the apparatus is being operated in the copying mode. Consequently, the advantage of the composite apparatus proposed in the laid-open application lies chiefly in respect of the economic point described above.

BRIEF SUMMARY OF THE INVENTION

Accordingly, an object of the present invention is to provide a multi-recording or composite recording apparatus which is capable of accommodating an urgent recording request issued from an external information source and allotted with a high priority thereby to record the relevant information in response to the request even when the apparatus is in the course of a copying or reproducing operation, and which allows the recording sheet carrying the image reproduced from the interrupt information to be discharged separately from other copying or recording sheets.

In view of the above object, there is proposed according to a general aspect of the invention a composite recording apparatus for recording information from different information sources, the apparatus including an optical system for projecting an image of an original supported on a copy board onto a photosensitive medium thereby to form an electrostatic latent image thereon, reproducing means for reproducing electric information on the photosensitive medium as an electrostatic latent image through a scanning operation and, developing means for visualizing the electrostatic latent image on the photosensitive medium to be recorded thereon, and a recording medium receiving means disposed adjacent to a discharge portion of the apparatus including a control apparatus which is so arranged that when a request for recording electric information is received from an external information source in the course of an electrostatic latent image being produced on the photosensitive medium by the optical system, a cycle for forming an electrostatic latent image of the electric information supplied from the external information source is initiated after the completed formation of a page of the electrostatic latent image through the optical system, and means for sorting and receiving recording sheets on which the external interrupting information has been recorded, the sorting and receiving means for the recording sheets being separately constructed from the receiving means for the copying sheets.

Here, for example, the priority order may be determined so that the recording operation based on electric signals takes priority over the copying operation and, furthermore, if there are two types of electrical signals such as a facsimile signal and a word processing signal. It may be determined that the recording operation in accordance with the facsimile signal takes priority over that dependent upon the word processing signal.

It goes without saying that the priority order, more particularly in the recording operation, can be decided suitably.

In the following, the invention will be described in detail by referring to the accompanying drawings which show exemplary embodiments of the invention.

DETAILED DESCRIPTION OF THE PREFERRED EMBODIMENT(S)

Figure 1:
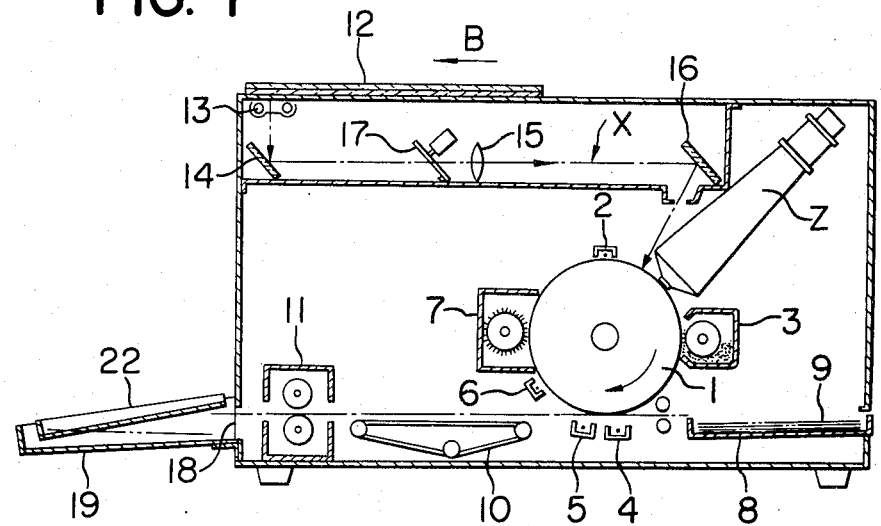
FIG. 1, is a schematic elevational sectional view showing a general arrangement of a composite recording apparatus according to an embodiment of the invention.

FIG. 1 shows, in an elevational sectional view, a general arrangement of an information recording apparatus to which the invention is applied. Although the description is presented on the assumption that the information recording apparatus is designed as an image transfer type recording or copying apparatus, it will be appreciated that the invention can be equally applied to a direct recording apparatus in which a light sensitive sheet is employed as a recording paper. Furthermore, although the information recording apparatus as illustrated is implemented as a movable copy board type apparatus, the invention can alternatively be embodied as a recording apparatus of the movable optical system type.

Now referring to FIG. 1, there is provided a photosensitive medium which may be constituted by a rotatable drum 1 having a peripheral outer wall provided with a photosensitive layer formed of Se, ZnO or the like. Disposed around the photosensitive drum 1 are a corona charging device 2, a developing device such as the magnetic brush developing device 3, a transferring electrode 4, a separating electrode 5, a charge removing means 6 and a a cleaning means 7, all adjacent to the drum surface and to one another in this order as viewed in the rotating direction of the drum 1 indicated by the attached arrow. A recording sheet (plain paper) 9 as supplied from a magazine 8 is caused to pass between the photosensitive drum 1 and the transferring electrode 4 to receive a toner image from the photosensitive drum 1 in accordance with the operation. Thereafter, the recording sheet now carrying the toner image is fed to a fixing apparatus 11 through a transporting mechanism 10, whereby the toner image is fixed. The recording sheet 9 which now carries the visualized and fixed image is then discharged from the recording apparatus.

At the top of the apparatus, there is provided a copy board 12 supporting an original to be copied and adapted to be moved in the direction indicated by the arrow B at a controlled speed in an image forming operation. The copy board 12 is illuminated by a light source 13 disposed immediately below the board 12. An exposure optical system X composed of a first mirror 14, a lens 15 and a second mirror 16 is provided between the copy board 12 and the photosensitive drum 1. The exposure optical system X serves to project an image of the original onto the photosensitive or photoconductive peripheral surface of the drum 1 at a location between the corona charging device 2 and the developing device 3, as a result of which a corresponding electrostatic latent image is produced on the drum surface.

On the other hand, disposed between the corona charging device 2 and the developing device 3 is a reproducing apparatus Z which includes an electro-optical converter means such as optical fiber tube (OFT) having a recording end face directed toward the photosensitive surface of the drum 1. The input terminals of the reproducing device Z are supplied with an electric information signal read out from memory equipment (of a computer system, for example) or a facsimile output signal. Thus, an electrostatic latent image represented by the electric signal is reproduced on the photosensitive drum surface through scanning operation of the reproducing apparatus Z. During the reproducing operation of the apparatus Z, the optical system X must be held inoperative. To this end, control is effected so as to inhibit energization of the light source lamp 13 as well as operation of a shutter 17.

Figure 2:
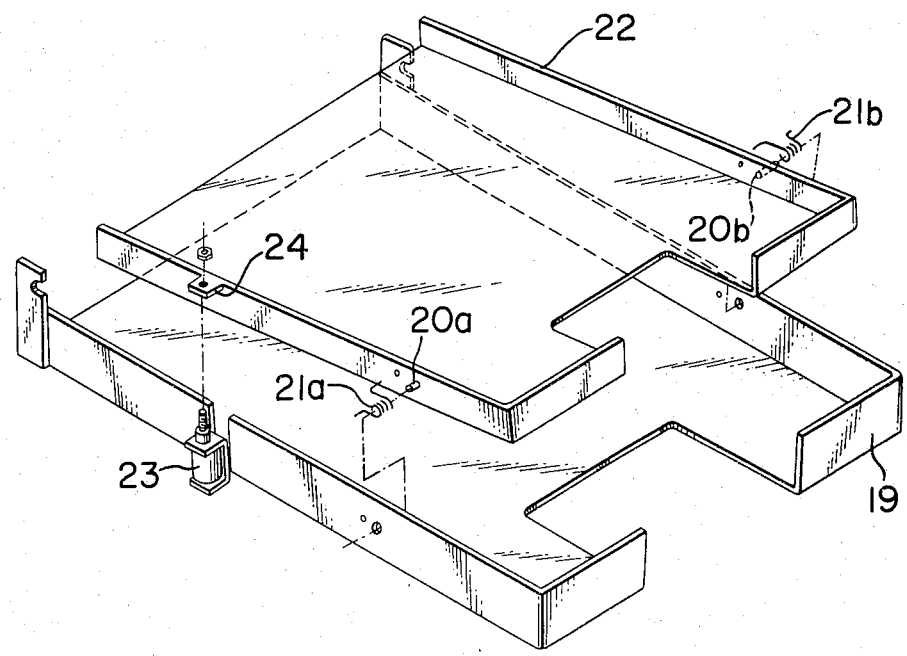
FIG. 2 is an exploded perspective view of a recording sheet collecting tray employed in the apparatus shown in FIG. 1.

A sheet collecting tray assembly is provided exteriorly of the machine body of the recording apparatus for receiving the recording sheets 9 from the image fixing device 11. As is illustrated in detail in FIG. 2, the collecting tray assembly includes a sheet receiving means 19 having an open end positioned adjacent to a sheet discharging porting 8 (FIG. 1) and a sorter mounted on and constructed separately from the sheet receiving means 19. The sorter comprises a sheet sorting and receiving means 22 which is pivotally mounted on the receiving tray 19 by means of stud shafts 20a and 20b and urged by bias springs 21a and 21b so that the sorting tray 22 is normally inclined at an elevated angle relative to the discharging portion 18 (refer to FIG. 1). An electromagnet 23 is fixedly secured to a side wall of the sheet receiving means 19 and the operatively movable rod of the electromagnet is connected to a bending portion 24 provided on a side wall of the sorting tray. Upon energization of the electromagnet 23, the sorting tray 22 is rotated in the clockwise direction as viewed in FIG. 1 against the force of the bias springs 21a and 21b. As will be described hereinafter, energization of the electromagnet 23 is controlled by a timer which is triggered by a signal initiating a priority recording cycle.

Figure 3:
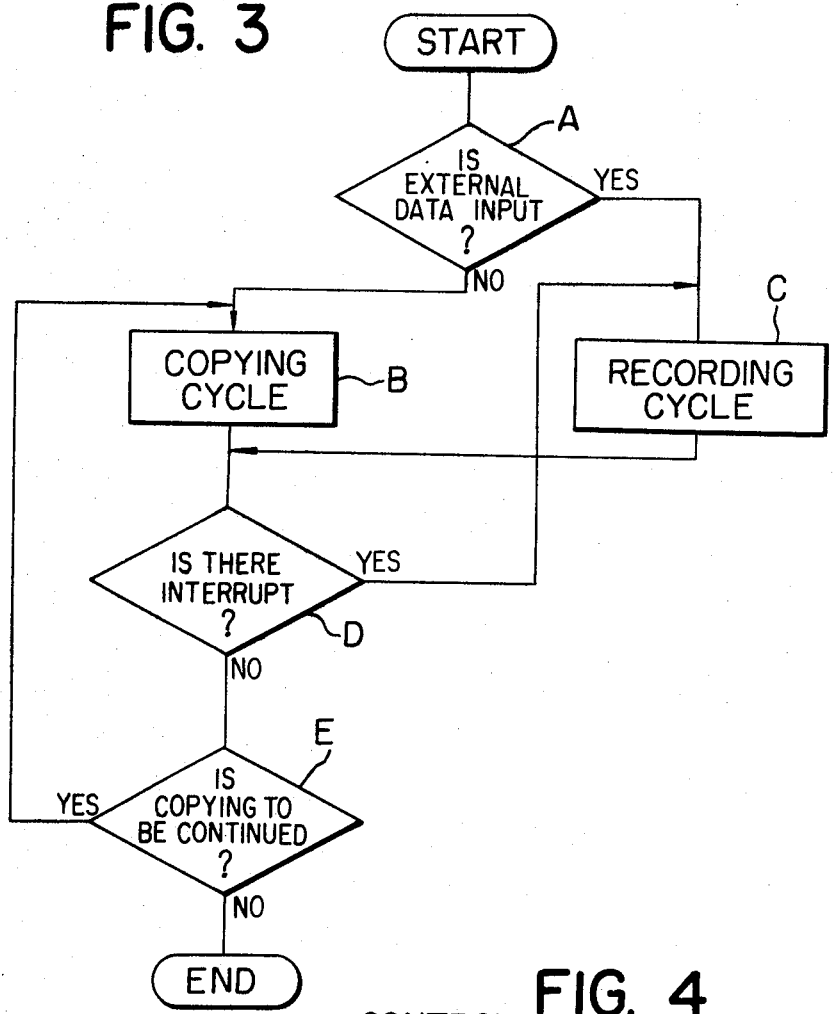
FIG. 3 is a flow chart illustrating the processing of information in the composite recording apparatus shown in FIG. 1.

In the information composite recording apparatus described above, when a request for copying an original or for recording a first electric information signal appears simultaneously with a request for recording a second electric information, such requests are processed in a manner illustrated in the flow chart shown in FIG. 3. More particularly, when a recording command is issued, a decision is made as to whether the copying of an original is being requested or the recording of a first or second electric information signal is commanded (at block A). When it is determined that the original is to be copied, a copying cycle (block B) is executed to optically produce an electrostatic latent image corresponding to a single page of the original on the photosensitive drum surface, which image is, after having been developed as a toner image, transferred to the recording sheet. On the other hand, when it is determined (at the decision block A) that a first electric information signal is to be reproduced, the recording cycle (block C) is executed whereby an electrostatic latent image corresponding to a page of the first electric data signal is produced to be subsequently recorded on the recording sheet after having been developed into a toner image. After completion of the production of the electrostatic latent image on the photosensitive drum in the copying cycle (B) or the recording cycle (C), it is determined at step D whether there is a request for recording a second electric information or data signal (interrupt request). When the interrupt request is present, the routine is returned to the recording cycle (C), thereby to effect the recording of the second electric information or data. On the other hand, when the interrupt request is absent at step D, a decison is made at decesion step D as to whether or not the copying cycle is to be continued. When the answer is "Yes", the copying cycle is returned to step B to perform the copying operation for one more page of an original. Thereafter the routine once again enters decision step D. If the copying operation is not to be repeated, the copying operation of the recording apparatus comes to the end.

In this way, when request for recording second electric information signal appears in the course of recording first electric information recording of the second electric information is allowed after the first electric information of a single page has been recorded, whereby the waiting time for recording the second electric information can be reduced to a minimum. Thus, the recording apparatus according to the invention is well suited for the multiple recording of external information or data such as facsimile signals for which a reduced waiting time is desired.

Figure 4:
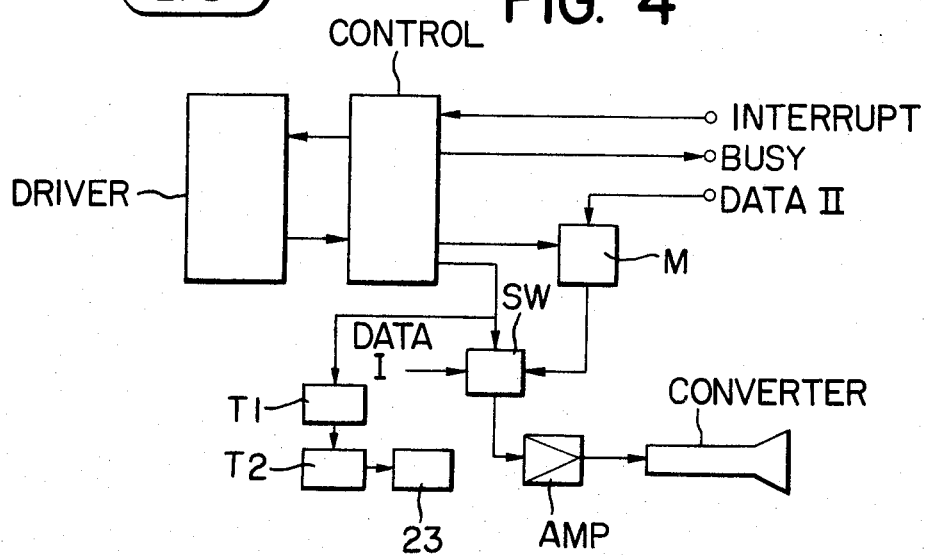
FIG. 4 is a block diagram showing an arrangement of a control system for executing the information processing procedure illustrated in the flow chart of FIG. 3.

FIG. 4 shows in a block diagram an exemplary embodiment of a control apparatus for executing the program illustrated in the flow chart of FIG. 3. A control circuit labeled CONTROL may be constituted by a micro-computer or the like in which the program described above in conjunction with the flow chart of FIG. 3 is contained. When a signal INTERRUPT requesting the recording of an external information or data signal is input during the copying operation or in the stand-by mode, the request is processed as an interrupt request whereby the external information is immediately recorded if the recording apparatus is in the stand-by mode. On the other hand, in the copying mode (in the course of producing an electrostatic latent image), a signal BUSY is output to the external information source. After completion of the copying a single page, the signal BUSY is cleared, whereupon the electric information signal DATA II is supplied to a memory M from the external information source. The information may be either in a form of a digital code or an analog signal such as a facsimile signal. Where the external information source itself incorporates therein a memory (or alternatively the outputting of information from the information source can be delayed as in the case of facsimile equipment) provision of the memory M may be spared. However, when information or data transmitted at a relatively low rate, such as facsimile information, is to be recorded by the recording apparatus according to the invention, it is preferred to temporarily store such information in the memory M for an interval corresponding to the reproduction time for a single page and to then issue the interrupt request for allowing the information to be read from the memory M and recorded at the high recording rate attainable in the recording apparatus according to the invention. In this manner, the utilized efficiency of the recording apparatus can be significantly improved. The information stored in the memory M is supplied to a video amplifier AMP through a switching circuit SW controlled by the control circuit CONTROL and thence to an electo-optical converter such as an optical fiber tube, the light output signal from which is projected onto the photosensitive medium for recording thereon. The switching control signal from the control circuit is simultaneously applied to a timer T1 which is then operated for a predetermined duration corresponding to the normal time duration from initiation of a recording cycle to the initiation of recording sheet discharge. After lapse of the preset time duration, the timer T1 triggers a second timer T2 which is preset to be operative for a predetermined time duration corresponding to the normal time span between initiation and termination of recording sheet discharge, thereby to energize the electromagnet 23 for the predetermined time period of T2. In this manner, the recording sheet 9 on which the interrupt information has been recorded is discharged onto the sorting tray 22. The switching circuit SW is adapted to a switch between the signal read out from memory M and the first electric information signal DATA I to each other. A drive unit DRIVER is adapted to control the operations of the various elements (such as the copy board, for example) in accordance with drive command signals produced from the control circuit, while supplying to the control circuit timing signals representative of the operating states of the various elements. It should be mentioned here that the external information sources from which the first electric information signals are received need not be restricted to two types but more than two types of external information can be processed through the interrupt procedure with priority being appropriately allotted among these external data.

As will be appreciated from the foregoing description, a request for recording the second information appearing in the course of a copying operation or of recording first electric information can be processed with a minimum waiting time, thereby allowing the second information to be recorded without involving any appreciable loss of time. Furthermore, the recording paper on which the priority information is recorded in response to the interrupt request can be discharged separately from the other recording or copying sheets, thus reducing the possibility of the recording sheet resulting from the interrupt recording operation being inadvertently lost.

What is claimed is:

1. In a recording apparatus for recording information on copy sheets from multiple sources and including a photosensitive medium, an optical system for projecting an image of an original to be copied onto the medium in an optical copying operation, reproducing means for producing an electrostatic latent image on the medium in accordance with an electric information signal in a reproduction operation, and a sheet receiving tray for receiving sheets discharged from the recording apparatus, and wherein receipt by the apparatus of an electric information signal during an optical copying operation in progress initiates production on the medium of a latent image in accordance with the information signal upon completion of the optical copying operation then in progress, the improvement comprising:

at least a sorting tray movably connected to the receiving tray for receiving discharged copy sheets upon which information in accodance with electric information signals is recorded, and operative means for relatively moving the receiving tray and said sorting tray such that discharged copy sheets of optical copying operations are directed to the receiving tray and discharged sheets of reproduction operations are directed to said sorting tray.

2. In a recording apparatus according to claim 1 wherein the receiving and sorting trays are pivotally connected to one another, biasing means for normally urging said sorting tray into a first position with respect to the receiving tray such that copy sheets discharged from the recording apparatus are normally directed to the receiving tray.

3. In an apparatus according to claim 1, said operative means comprising an electromagnet.

4. In a recording apparatus according to claim 3, said electromagnet being mounted on the receiving tray and including an actuator connected to said sorting tray for relatively moving said sorting tray with respect to the receiving tray.

* * * * *